Patented Oct. 4, 1932                                      1,880,394

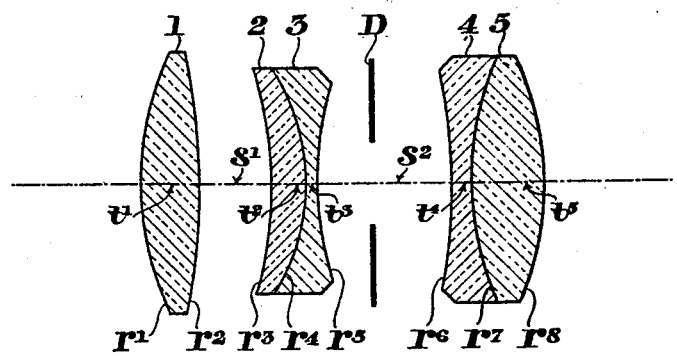

UNITED STATES PATENT OFFICE

FRED E. ALTMAN, OF ROCHESTER, NEW YORK, ASSIGNOR TO EASTMAN KODAK COMPANY, OF ROCHESTER, NEW YORK, A CORPORATION OF NEW YORK

PHOTOGRAPHIC OBJECTIVE

Application filed December 11, 1930. Serial No. 501,529.

My invention relates to photographic objectives and more particularly to objectives comprising three air spaced components of which the two outer are positive and the inner one is negative.

It is an object of my invention to produce an objective particularly suited for airplane cameras where long range and good ultimate definition are prime prerequisites.

Objectives for photographic purposes and especially for aerial cameras should have all of the usual corrections but the most difficult and the most important of all the corrections is astigmatism since the quality of a lens depends upon the approach to absence of astigmatism.

Since aerial cameras are usually designed to work at high altitude, a relatively small angle lens i. e. about 15°, is suitable.

It is well known that ordinary objectives for airplane cameras have zero astigmatism both on the optical axis and approximately 23° from this axis, and since in the present lens I am interested only in an angle of about 15°, I so choose the different elements of my objectives that zero astigmatism falls at a point less than 15° from the optical axis. This small distance for the nodal point, or zero astigmatism, gives a substantially flat field for the entire area covered by my objective.

It is an object of my invention to provide an objective for narrow angle airplane cameras which will be free from all residual aberrations over the limited field of view, and for an aperture of approximately "f.6.0."

In my objective, I choose crowns of high index which permits the use of less powerful dispersive lenses, which in turn results in an objective of a relatively short focal length. The use of a negative lens having this lower power will not meet the requirements of the Petzval condition unless glass of low index is chosen, which will restore the Petzval sum to a satisfactory extent.

The choice of a glass of low refractive index for the negative lens to satisfy the Petzval condition makes it impossible to correct the system for chromatic aberration because of the corresponding lower dispersive power of such a glass. However, I have found that if a positive lens of relatively high index and low dispersion is made an integral part of said negative lens, it may be made hyperchromatic and the system may be achromatized without disturbing the requirements of the Petzval condition, and thus obtain a substantially flat field for an angle of 15°.

Also, it is to be noted that the Petzval sum is more fully satisfied than when this hyperchromatic negative is made of two glasses having the same refractive index.

It is also to be noted that by making the cemented surface in the negative lens collective, I am able to eliminate zonal spherical aberrations much more completely than has been previously possible. In fact, the objective of my invention working with an aperture of "f.6.0" has a zonal variation of spherical aberration less than .004% of its focal length.

The accompanying drawing shows a constructional example of a photographic lens according to my invention. This example comprises a single collective lens 1, a biconcave dispersive lens composed of two members 2 and 3, and a collective lens composed of two members 4 and 5. The diaphragm D is provided between the dispersive lens and the last mentioned collective lens.

The following table shows the data for a photographic lens designed to work with an aperture of "f.6.0," and to cover a substantially flat image field of 15°. The following figures are for an objective having a focal length of 100 units.

| Lens | Focal length | Glass | Radii | Thickness and separation |
|---|---|---|---|---|
| 1 | +40.53 | $D= 1.61088$ $G'= 1.62448$ $\nu=57.2$ | $r^1= 27.52$ $r^2=237.52$ | $t^1=2.74$ $s^1=5.22$ |
| 2 | +44.67 | $D= 1.61088$ $G'= 1.62448$ $\nu=57.2$ | $r^3= 35.24$ $r^4= 15.70$ | $t^2=1.96$ $t^3=0.56$ |
| 3 | −16.66 | $D= 1.54995$ $G'= 1.56559$ $\nu=45.8$ | $r^5= 22.26$ | $s^2=7.54$ |
| 4 | −35.71 | $D= 1.52301$ $G'= 1.53633$ $\nu=50.5$ | $r^6=136.41$ $r^7= 21.69$ | $t^4=0.84$ $t^5=3.35$ |
| 5 | +21.86 | $D= 1.61088$ $G'= 1.62448$ $\nu=57.2$ | $r^8= 32.73$ | |

The focal length of the compound negative lens equals −25.82 and the focal length of the front component equals −148.12 while the focal length of the rear component equals +52.85.

While I have described and given data for the preferred form of my invention, it is to be understood that I do not wish to be limited thereby, but desire to cover all modifications and equivalents which fall within the scope of the appended claims.

What I claim is new and desire to secure by Letters Patent of the United States is:

1. A photographic objective of the type comprising three air spaced components of which the two outer are positive and the inner is a negative doublet, and characterized by one of the positive components being a doublet comprising a negative element of glass having a refractive index for the D-line of less than 1.55 and a positive element of glass having a refractive index for the D-line greater than 1.60.

2. A photographic objective comprising three air spaced components of which the front component is a single positive lens, the middle component is a negative doublet and the rear component is a positive doublet consisting of a negative lens and a positive lens made of glass having a much higher refractive but a lower dispersive power than the glass of the negative lens.

3. A photographic objective of the type comprising three air spaced components of which the front component is a single positive lens of highly refractive crown glass, the rear component is a positive doublet and the inner component is negative, and characterized by the negative component being a doublet and hyperchromatic.

4. A photographic objective of the type comprising three air spaced components of which the front one is a single positive lens, the rear one is a compound lens and the middle one is a hyperchromatic negative compound lens consisting of a collecting lens and a dispersing lens made of glass having a much lower refractive but a greater dispersive power than the glass of the collecting lens.

5. An achromatized photographic objective in which the Petzval condition is fulfilled comprising three air-spaced components of which the front component is a single positive lens, the middle component is a positive lens cemented to a negative lens and the rear component is a negative lens cemented to a positive lens and characterized by all of the negative lenses being made of glass having a refractive index substantially lower than the glass in the positive lenses.

Signed at Rochester, N. Y. this 8th day of December 1930.

FRED E. ALTMAN.